Patented June 9, 1925.

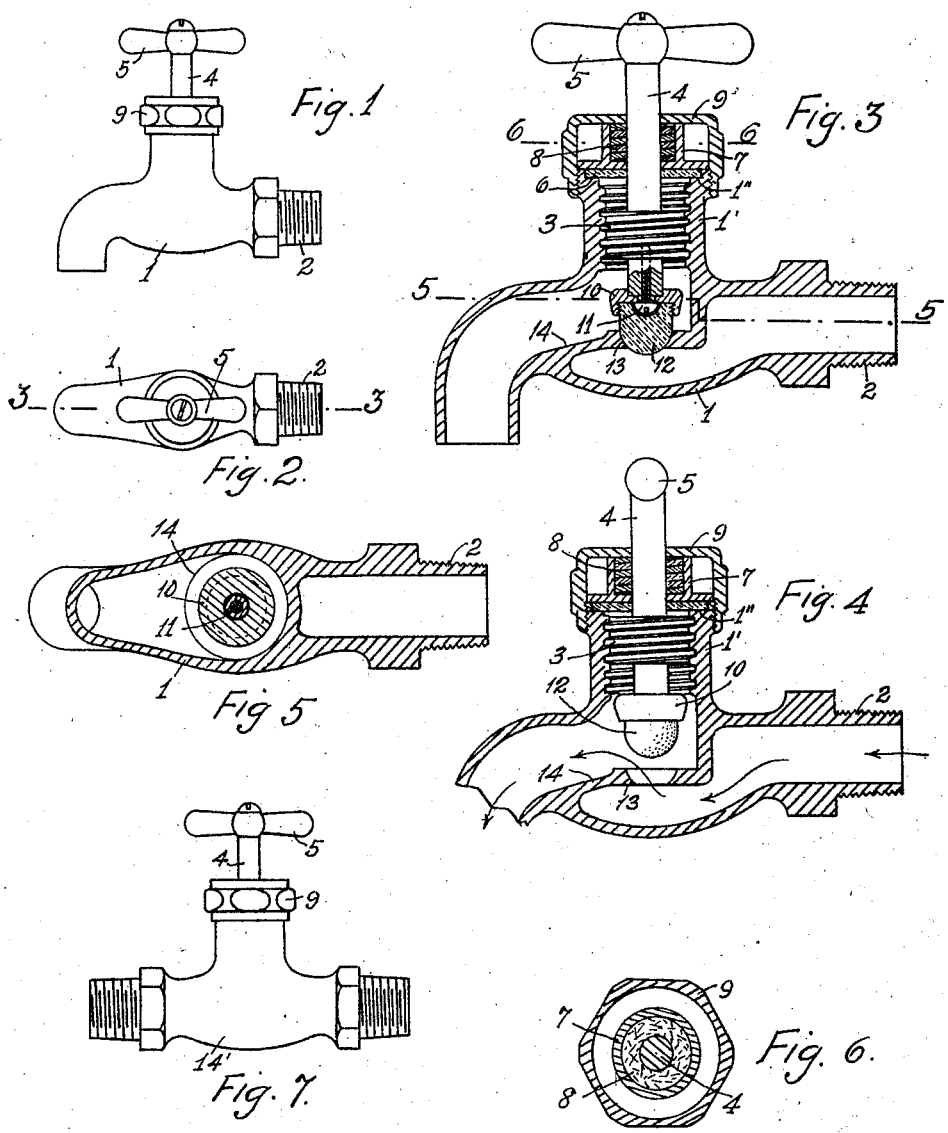

1,540,839

UNITED STATES PATENT OFFICE.

ROBERT HEYDRICH Y MARTINEZ, OF HABANA, CUBA.

FAUCET AND SIMILAR DEVICE.

Application filed May 5, 1924. Serial No. 711,211.

*To all whom it may concern:*

Be it known that I, ROBERT HEYDRICH Y MARTINEZ, citizen of the Republic of Cuba, and residing at Habana, Cuba, have invented certain new and useful Improvements in Faucets and Similar Devices, of which the following is a specification.

This invention relates to faucets and cocks of the usual type and also to feed cocks, float valves for closet tanks and other similar devices and has for its principal object to provide an improved construction in said devices by which leakage and dripping is avoided thereby effecting a considerable saving in the wastage of water which is important in a city, and especially in those cities where the water supply is insufficient or where meters are not used.

Another object of this invention is to modify the construction of such mechanism so that the obturator element, which in present constructions, due to the materials of which it is made, is easily worn out, will be protected against undue wear by swiveling it to its stem to prevent grinding it on its seat, thereby giving it a much longer life than usual in such devices.

It is a further object of this invention to provide means by which the obturator element may be easily replaced when worn out.

A further object is to prevent leakage around the obturator element stem by providing a novel packing for the stem.

More advantages and other considerations pertaining to this invention will be deduced in the course of the specifications and by the aid of the attached drawings, in which similar characters of reference designate similar parts.

In the drawings:

Figure 1 is a side elevation of a faucet according to the present invention.

Figure 2 is a top plan view of Fig. 1.

Figures 3 and 4 are longitudinal vertical sections to an enlarged scale on line 3—3 of Fig. 2, showing the parts in different operative positions.

Figure 5 is a horizontal section on line 5—5 of Fig. 3.

Figure 6 is a horizontal section on line 6—6 of Fig. 3 and

Figure 7 is a side elevation of a different form of cock, embodying the invention.

In the drawings is shown a faucet or cock having a body 1 and an inlet nipple 2 of the usual type.

An upper open extension 1' of the body is internally threaded and receives a threaded collar 3 carrying the valve stem 4 having a handle 5. In the extension 1' is formed an annular seat 1'' whereon is seated a washer 6 on which bears a stuffing box 7 carrying a packing filler 8. The extension 1' is normally closed by a cap 9 screwed thereon.

The lower end of the stem 4 loosely carries, by means of a screw 11 a ring 10 having a peripheral internally threaded flange receiving a threaded obturator 12, made of rubber or other suitable material, and having a rounded lower end.

The obturator 12 is in vertical alignment with a port 13 in a closure partition 14 of the body.

The operation of the device is as follows: The parts being in the positions shown in Fig. 3, that is, with the faucet closed, it is obvious that the closing provided by the obturator 12 in its seat 13 is sufficient to prevent leakage and dripping from the faucet, as, by turning the handle 5, the stem 4 and the threaded collar 3 are moved downwardly to press on the obturator 12, which, on account of the loose fitting of the ring 10, does not turn.

To open the faucet it is sufficient to merely turn the handle 5 in the reverse direction, to raise the obturator 12, and permit flow of fluid.

I claim:

1. A valve device, comprising, a body, an open neck extending from the body, a valve stem in the body and extending through the neck, a valve carried by the stem, a gasket receiving the stem and closing the outer end of the neck, a flat packing plate positioned over the gasket and receiving the stem, an upstanding rim on the plate forming a stuffing box receiving the stem, packing means in the stuffing box, and a screw thimble threaded to the outer surface of the neck and enclosing the above said gasket, plate, and stuffing box.

2. A valve device, comprising, a body, an open neck extending from the body, a valve stem in the body and extending through the neck, a gasket receiving the stem and closing the outer end of the neck, a flat packing plate positioned over the gasket and receiving the stem, an upstanding rim on the plate forming a stuffing box receiving the stem, packing means in the stuffing box, and a screw thimble threaded to the outer surface of the neck and enclosing the above said gasket plate and stuffing box, a screw threaded aperture in the lower end of the stem, an internally threaded flanged ring, a screw loosely holding the ring to the end of the stem, and a resilient valve having external threads and screwed into the flange of the ring, whereby to adjustably connect the valve to the valve stem.

In testimony whereof I have signed my name to this specification, 28 April, 1924.

ROBERT HEYDRICH y MARTINEZ.